United States Patent [19]

Sweeney et al.

[11] 4,031,578

[45] June 28, 1977

[54] CONTOURED TRAVEL PILLOW

[76] Inventors: Doris Sweeney, 512 A Taylor Ave., Warrington, Pa. 18976; Mary Ellen Lee, 7951 Anita Drive, Philadelphia, Pa. 19111

[22] Filed: May 20, 1976

[21] Appl. No.: 688,550

[52] U.S. Cl. .................................................. 5/337
[51] Int. Cl.[2] ...................... A47G 9/00; A61G 7/06
[58] Field of Search .............. 5/337, 338, 339, 355, 5/354

[56] References Cited

UNITED STATES PATENTS

| | | | |
|---|---|---|---|
| 1,385,355 | 7/1921 | Banks | 5/338 |
| 2,239,457 | 4/1941 | Gibbons | 5/355 X |
| 2,522,120 | 9/1950 | Kaskey et al. | 5/338 X |
| 2,562,725 | 7/1951 | Leto et al. | 5/338 |

Primary Examiner—Paul R. Gilliam
Assistant Examiner—A. M. Calvert
Attorney, Agent, or Firm—Joseph W. Molasky

[57] ABSTRACT

A travel pillow is described for use with seats which provide an accommodating headrest. This pillow cushions the user's neck and head in a cavity and thus provides support against 'head-rolling' and the sudden 'head-drooping' which usually results when a traveler attempts to sleep while sitting in a generally upright position.

8 Claims, 5 Drawing Figures

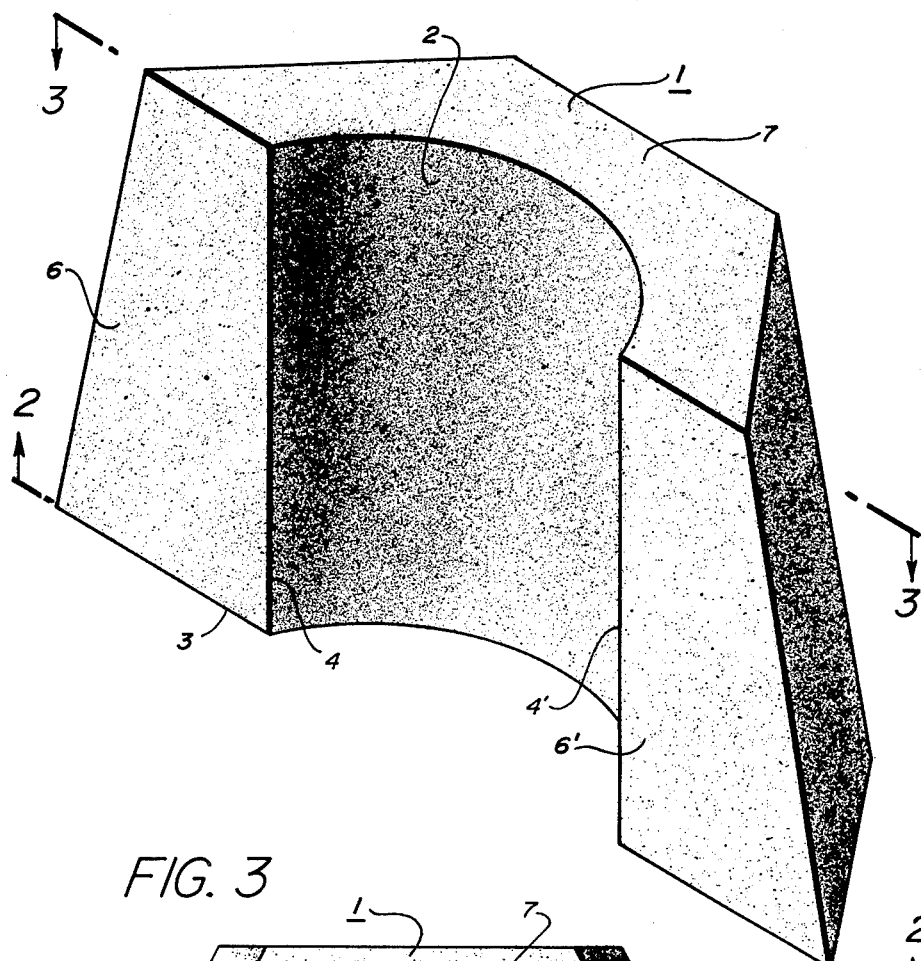
FIG. 3
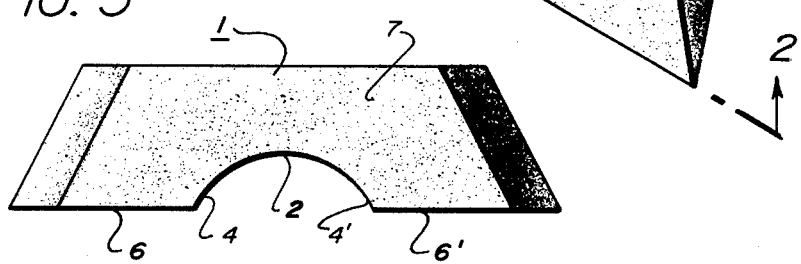
FIG. 2
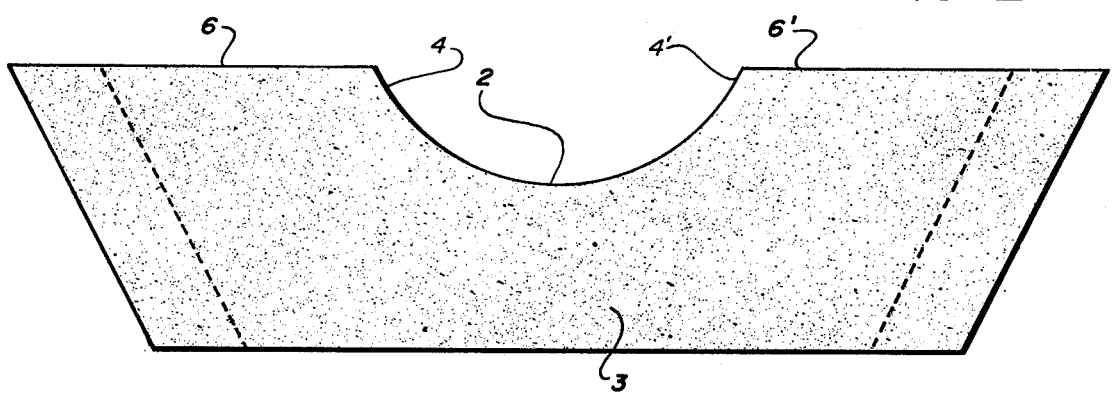

CONTOURED TRAVEL PILLOW

This invention relates to a portable travel pillow which is designed to hold the head of the user in an essentially upright position.

BACKGROUND

One disadvantage to traveling by common carrier or auto is the difficulty one encounters in attempting to sleep or rest comfortably.

This difficulty is due in large part to the incessant drum of traffic and sudden noises and, most importantly, to the upright or semi-upright position in which most travelers are required to sit while they are being conveyed from one destination to another.

Obviously, these difficulties could be overcome or, in the very least, they could be abetted if the traveler were provided with means for placing his head in a secure and relaxed position. Preferably, such means would also include the ability to shut out bothersome noise.

Unfortunately, however, public conveyances and automobiles are not equipped with such means. Indeed, the head support generally available to the traveler is the seat itself or, more specifically, the extended backrest which rises above the occupant's shoulders and which thus affords him a one-dimensional support for the back of his head. No provision is made for cushioning the traveler's head to protect it from the sudden drooping which occurs when the passenger falls into a fitful sleep. Consequently, when sleep does come it is usually not a refreshing one. If not awakened by a sudden noise, then the traveler is very likely to find himself startled by the sudden drop of his head or by the rolling of his head from side to side.

To overcome this nuisance, some carriers supply passengers with pillows for their convenience. However, this service is by no means universal and, if it is available, the quantity may be limited due to the fact that carriers cannot afford to occupy limited storage space with bulky convenience items.

Furthermore, pillows must be nestled in a corner, or the like, in order to effectively cradle one's head and prevent it from rolling from side to side.

In short, the user of public conveyances and automobiles has no means now available for the safe, secure and comfortable nesting of his head so as to protect it during travel.

THE INVENTION

We have developed a portable cushioning device which essentially overcomes the aforementioned difficulties. It provides the traveler with all the comforts of a pillow, but without any of its disadvantages.

More particularly, we have devised a safe and effective cushioning device which travelers will find conducive to sleep and which, at the same time, will provide the carrier with a space-saving item which requires very little in the way of handling, maintenance and storage.

We refer to this item as a "Contoured Travel Pillow" (hereinafter "pillow").

An object of this invention is to provide a shaped or contoured pillow which firmly cradles the traveler's head and neck. This pillow is supported by the compaction which results when said pillow is placed between the user's head and the headrest of the accommodating seat. Also, in one embodiment of this invention, the pillow is additionally supported by allowing it to rest upon the user's shoulders.

More specifically, this invention relates to a firm, contoured travel pillow which is supported principally from behind by the backward pressure of the user's head against whatever headrest or backrest is available. This pillow comprises two lateral head supports located adjacent to one another but separated from each other by a spacer or a bridge which, in addition to acting as a divider between the two head supports, also serves as a base for receiving the back of the user's head and neck.

According to one embodiment of this invention the pillow thus described is also characterized by:
1. an essentially flat base, and
2. a semi-circular, hollowed-out front portion which runs perpendicular to said base, from top to bottom, and adapted to receive the back of the user's head and neck. This pillow is intended for use with a seat having an accommodating headrest or backrest.

One other embodiment of this invention has also proved to be particularly effective in providing user support and head comfort. According to this aspect of our invention the lateral head supports of the pillow are discrete elements separated from one another by a spacer which maintains the said head supports at a head's-width distance from one another while, at the same time, providing support for the back of the user's head and neck. The backward pressure of the head and neck onto the said spacer presses it into the headrest of the accommodating seat and this action draws the lateral head supports closer together, that is, toward the sides of the user's head, so that they engage the head laterally in a snug and comfortable manner.

This invention will now be described by reference to The Drawings and The Embodiments.

THE DRAWINGS

FIG. 1 is a perspective view of one embodiment of the instant pillow.

FIG. 2 is a bottom view of the pillow of FIG. 1 along lines 2—2.

FIG. 3 is a top view of the pillow of FIG. 1.

THE EMBODIMENTS

Figure 4:
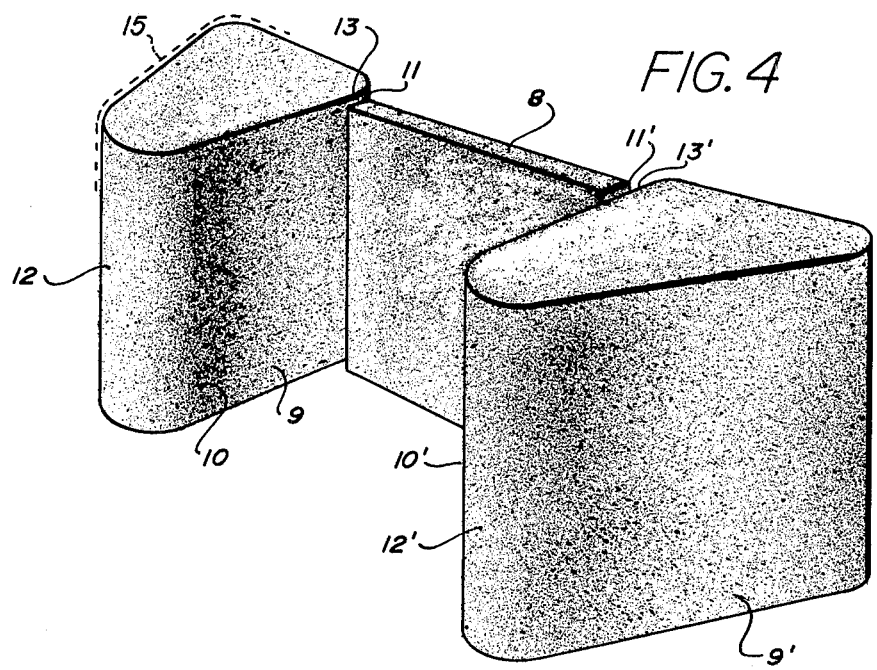
FIG. 4 is a perspective view of another embodiment of the instant pillow.

The pillow of FIG. 1 is essentially pyramidal in shape and is characterized by a truncated top. The base 3 of this pillow is appreciably wider than the top surface 1 so that it can rest comfortably upon the user's shoulders. Also, it contains a semi-circular, hollowed-out front portion 2 which rises perpendicular from base 3. This hollowed-out portion 2 separates the lateral head supports 6 and 6' from one another and also serves as the receiving means for the user's head and neck. The area defined by hollowed-out portion 2 comprises a radius of about 160°–200° but, preferably, a radius of about 180°. The spacer or bridge 7 serves as a demarcation between head supports 6 and 6'. This bridge separates the support elements from one another and at the same time joins them to the pillow as a whole so that they constitute an integral part thereof.

FIG. 2 illustrates a bottom view of the pillow described in FIG. 1. From this illustration it is readily apparent that the breadth or thickness of said pillow is not particularly great and that it can vary to suit the size of the individual whom it is designed to serve.

FIG. 3 illustrates a typical top view of the pillow of FIG. 1. From this illustration it can be seen that the area of top surface 1 is appreciably smaller than its base 3. This makes the instant pillow more stable and much easier to maintain comfortably upon the user's shoulders than would otherwise be the case. Furthermore, there is sufficient surface area along both the top surface 1 and base 3 to accommodate the semi-circular, hollowed-out portion 2 which runs perpendicular to said base 3 and top surface 1. This feature provides significant durability and firmness to the resulting pillow. As a result of this construction, the user's head and neck, when cushioned in the semi-circular cavity 2 will be firmly held in place comfortably and securely between the support elements 6 and 6' without any sway or drooping.

In a typical example, the travel pillow of FIGS. 1-3 is utilized by placing the base 1 upon the shoulders of the person using same. Also since the base measures at least 3 inches in thickness, the pillow can be supported by the shoulders of a child as well as by an adult.

Once the pillow (FIGS. 1-3) has been placed upon the user's shoulders his head is placed in the cavity or semicircular, hollowed-out portion 2. Thus ensconced, the user's neck, ears and sides of his head come into contact with the left and right inner sides 4 and 4' of cavity 2. By virtue of this contact the user's head is secured against any sudden droop or rolling and his ears are protected from extraneous noise. The dimensions of the instant pillow are not especially critical and, in practice, its size can be varied to meet the dimensions of the traveler who is to be served by this invention. Thus, in the case of an adult, the base of the instant pillow can measure from about 13 inches to 17 inches along its front portion and from 3 and ¼ to about 5 inches in thickness; however, in a preferred embodiment of this invention I prefer to use a pillow whose base along the front portion is about 15 inches and whose thickness is approximately 4 and ¼ inches.

A typical pillow of this invention designed for a child, may measure from 10 to 12 inches in length along the front portion of the base and about 3 to 4 inches in thickness.

The height of the pillow shown in FIGS. 1-3 is not particularly critical. However, according to one embodiment of this invention a pillow measuring approximately 6 and ¼ inches in height along cavity 2, measuring from base 3 to top surface 1, was found to be particularly suitable.

Also, in practice, it is not essential that the user's head be entirely within the cavity 2. It is sufficient that the user's ears be confined within that recess.

Figure 5:
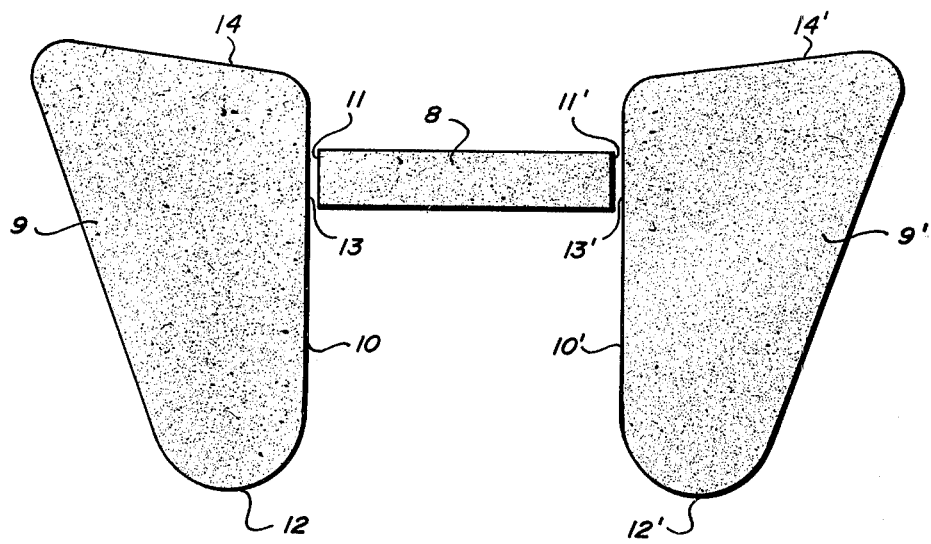
FIG. 5 is a top view of the pillow of FIG. 4.

FIGS. 4 and 5 illustrate a particularly preferred aspect of this invention. A spacer element or bridge 8 is located between the lateral head supports 9 and 9'. This spacer maintains the supports at a suitable distance from one another so that a person's head can be comfortably ensconced within the cavity defined by sidewalls 10 and 10'. The spacer 8 is a flat and essentially rectangular element whose sidewalls 11 and 11' abut the rear sidewalls 13 and 13' of head supports 9 and 9'. It may be integrally connected to said head supports but, in practice, we prefer to use the spacer 8 and supports 9 and 9', as discrete elements. These elements are kept in place and made to function as a single unit by virtue of a form-fitting cover 15 which slips over the said elements and maintains them in an operable mode. Said cover is comprised of a durable material and is designed to accommodate supports 9 and 9' and spacer 8 in a tight-fitting modality. Thus fitted, the sidewalls 11 and 11' of spacer 8 are contiguous to sidewalls 13 and 13' of the head supports and, when fitted with the cover 15, the combination of spacer 8 and supports 9 and 9' are held together in a unitary but composite relationship. Indeed, the individual elements are so closely held together in a fixed arrangement by said cover that the backward pressure of a person's head on spacer 8 results in a series of reactions which ultimately cause sidewalls 10 and 10' to engage the sides of the user's head.

A typical example will serve to illustrate this operation.

Having seated himself in a seat with a fixed headrest, the occupant thereof places the back and sides of his head within the cavity defined by sidewalls 10 and 10' of the pillow of FIGS. 4 and 5 (enveloped by the tight-fitting cover 15). The backward pressure of the user's head upon spacer element 8 results in a depression of said spacer along its middle and this causes the sidewalls 11 and 11' of said spacer to pull-in sidewalls 13 and 13' of the head support elements 9 and 9'. This action results in the front portions 12 and 12' being drawn closer together and thus, also serves to bring the sidewalls 10 and 10' up against both ears and the sides of the user's head. With his head firmly held in this position the traveler may rest or sleep peaceably without danger of his head swaying or rolling from side to side.

In this particular embodiment the pillow does not rest upon the user's shoulders; instead, it is supported wholly by the backward pressure of the user's head upon said pillow and, in turn, the sidewalls 10 and 10' of said pillow snugly engage the sides of the occupant's head.

The dimensions of this pillow (FIGS. 4 and 5) are not critical and they may be varied to suit the size and other requirements of the person for whom it is intended; however, a typical pillow which can accommodate most adults and adolescents is one in which the head supports 9 and 9' and spacer 8 measure approximately 5 to 6 inches in height but, preferably, 5 and ¼ inches. The support elements 9 and 9' have a generally diminishing thickness which begins at the rear sidewalls thereof. Thus, the sidewall dimensions are approximately 3 to 5 inches in thickness at the rear but, preferably, about 3 and ½ inches and gradually taper down to front portion thickness of from about 1 to 2 inches and preferably, about 1 and ⅝ inches at its narrowest point.

Although the cavity defined by sidewalls 10 and 10' may be varied to meet the specifications of the person for whom it is intended, nevertheless, a generally suitable dimension is one in which the distance from sidewall 10 to sidewall 10' is from about 4 to 5 inches but, preferably, 4 and ¾ inches.

The instant pillow is constructed of flexible material so that it can accommodate individuals whose measurements vary to a certain degree. Consequently, in practicing this invention, it is desirable to construct the pillow from a suitably adaptable material such as foam rubber or the like. In such instance, we prefer to utilize a mold to form a pillow of unitary construction.

According to another aspect of this invention the pillow may simply consist of an outer shell which is shaped to the specifications illustrated by FIGS. 1-3.

The shell is then stuffed with a suitable filler such as cotton, kapok, or a functionally equivalent material.

Regardless of the means used to construct the pillow it is characterized by a flexibility which permits it to adapt to the varying contours of the user. However, if the differences to be accommodated are appreciable as, for example, in the case of adults and children, then it is preferable to simply construct pillows of suitably different dimensions so as to provide a sufficiently comfortable neck and head rest for the user.

Also, in a preferred embodiment of this invention we prefer to construct the instant pillow from flame-retardant material so as to meet the Federal Safety Requirements imposed on interstate carriers.

An alternative and preferred aspect of this invention consists of constructing the instant pillow from an inflatable plastic or rubber material. According to this feature of the invention, the inflatable pillow is deflated for storage when it is not being used and is inflated for instant use. Such a pillow has the distinct advantage of being easily stored and, therefore, has particular appeal to common carriers.

It is also a preferred embodiment of this invention to cover the contoured pillow with a soft material for aesthetic and sanitary purposes. In this instance the cover may envelop the entire pillow or it may cover only the front portion of the pillow or the cavity which comes into contact with the neck and head of the user. In either case, it is most advantageous to employ a material which is flexible, has good stretching qualities and is flame-retardant.

Although the utilitarian aspects of this invention should be obvious to those skilled in the art, certain qualities of my device should be stressed.

In addition to having a distinct theraputic value as an aid to sleep, the instant pillow also provides a more restful posture and thus helps to eliminate the neck pains which usually result from any effort to rest or sleep comfortably in a moving vehicle.

In addition, the pillow of this invention makes it possible to shut out extraneous noise and thus aids and abets the traveler who requires a modicum of silence when resting, napping or sleeping.

Although I have described my invention with specificity it should be understood that this invention is not limited to the precise embodiments described herein. Modifications and variations on this concept will be apparent to those skilled in the art and to the extent that those adaptations are obvious I expressly include them as being within the scope of my invention.

What is claimed is:

1. A travel pillow comprised of three discrete and resilient sections:
    1. a central section which serves as a spacer and supports the back of the user's head and
    2. a matching pair of lateral head sections located on opposite sides of said spacer (1) to form a generally H-shaped configuration therewith;

and a snug-fitting cover which accommodates all three sections and maintains them in their generally H-shaped configuration;

both of the head sections (2) being of greater thickness than spacer (1) and possessing a tapered appearance which begins with a flat and generally wide back-wall and a narrower, rounded front portion;

said back-wall being disposed at an angle which slopes toward the central section so that the backward pressure of the user's head on said spacer (1) will cause the said back-walls to form an essentially parallel plane and draw the inner side-walls toward one another, for contact with the user's head.

2. The travel pillow of claim 1 in which the top and bottom sides are essentially flat.

3. The travel pillow of claim 1 in which the edges of the head sections are rounded.

4. The travel pillow of claim 1 in which the head sections are of such size that they cushion both the user's head and ears.

5. The travel pillow of claim 1 constructed of inflatable material so that the pillow can be deflated for storage and inflated for use.

6. The travel pillow of claim 1 constructed of foam rubber.

7. The travel pillow of claim 1 in which the cover is fabricated from flame resistant material.

8. The travel pillow of claim 1 in which the angle of the back-wall with respect to the support surface is such that, in use, the inner side-walls of the two head sections are caused to move toward one another and engage the user's head.

* * * * *